United States Patent
Jeong et al.

(10) Patent No.: US 9,735,607 B2
(45) Date of Patent: Aug. 15, 2017

(54) NON-CONTACT POWER SUPPLY APPARATUS, CHARGING APPARATUS, AND BATTERY APPARATUS

(71) Applicant: SAMSUNG ELECTRO-MECHANICS CO., LTD., Suwon-Si, Gyeonggi-Do (KR)

(72) Inventors: In Wha Jeong, Suwon-Si (KR); Hugh Kim, Suwon-Si (KR); Sung Youl Choi, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 187 days.

(21) Appl. No.: 14/586,887

(22) Filed: Dec. 30, 2014

(65) Prior Publication Data
US 2015/0188358 A1  Jul. 2, 2015

(30) Foreign Application Priority Data
Dec. 30, 2013 (KR) .................. 10-2013-0167765

(51) Int. Cl.
*H02J 7/02* (2016.01)
*H02J 5/00* (2016.01)
*H02J 7/00* (2006.01)

(52) U.S. Cl.
CPC .............. *H02J 7/025* (2013.01); *H02J 5/005* (2013.01); *H02J 7/0014* (2013.01); *H02J 7/0004* (2013.01); *H02J 7/0011* (2013.01)

(58) Field of Classification Search
CPC .................................. H02J 5/005; H02J 7/025
USPC ........................................................ 320/108
See application file for complete search history.

(56) References Cited

U.S. PATENT DOCUMENTS

| 6,100,663 | A | 8/2000 | Boys et al. |
| 6,163,131 | A | 12/2000 | Gartstein et al. |
| 2004/0263125 | A1 | 12/2004 | Kanno et al. |
| 2008/0058029 | A1 | 3/2008 | Sato et al. |
| 2009/0096413 | A1* | 4/2009 | Partovi ............ H01F 5/003 320/108 |

(Continued)

FOREIGN PATENT DOCUMENTS

| CN | 1578046 A | 2/2005 |
| CN | 201656576 U | 11/2010 |

(Continued)

OTHER PUBLICATIONS

Extended European Search Report issued on Jul. 16, 2015 in counterpart European Application No. 14275268.2 (9 pages in English).

(Continued)

*Primary Examiner* — Drew A Dunn
*Assistant Examiner* — Sailesh Thapa
(74) *Attorney, Agent, or Firm* — NSIP Law

(57) ABSTRACT

A charging apparatus maintains a balance in power between battery cells by respectively charging the battery cells with power, and rapidly charges the battery cells with power. The charging apparatus supplying unit wirelessly supplying power, and the battery apparatus includes a plurality of charging units corresponding to a plurality of battery cells in a one-to-one scheme. Each of the plurality of charging units respectively includes a charging unit charging a corresponding battery cell with power wirelessly received from the power supplying unit.

5 Claims, 22 Drawing Sheets

(56) References Cited

U.S. PATENT DOCUMENTS

| | | |
|---|---|---|
| 2011/0260532 A1 | 10/2011 | Tanabe |
| 2013/0020988 A1 | 1/2013 | Kim et al. |
| 2013/0127405 A1 | 5/2013 | Scherer et al. |
| 2013/0257371 A1 | 10/2013 | Komai et al. |
| 2013/0300204 A1 | 11/2013 | Partovi |
| 2013/0342161 A1 | 12/2013 | Byun et al. |
| 2014/0015330 A1* | 1/2014 | Byun .............. H02J 5/005 307/104 |
| 2014/0191713 A1* | 7/2014 | Hong .............. H02J 7/0029 320/108 |

FOREIGN PATENT DOCUMENTS

| | | | |
|---|---|---|---|
| CN | 102292896 A | 12/2011 | |
| JP | 2008-005630 A | 1/2008 | |
| JP | 2008-86196 A | 4/2008 | |
| JP | 2010-288442 A | 12/2010 | |
| JP | 2013-085363 A | 5/2013 | |
| KR | 2013-0054897 A | 5/2013 | |
| TW | EP 2482424 A2 * | 8/2012 | .......... B60L 11/1816 |
| WO | WO 2010/085701 A2 | 7/2010 | |

OTHER PUBLICATIONS

Chinese Office Action issued on Feb. 4, 2017 in Counterpart Chinese Application No. 201410842120.6 (26 pages in Chinese, with English translation).

Japanese Office Action issued on Dec. 6, 2016 in corresponding Japanese Patent Application No. 2014-266369 (5 pages in English, 2 paged in Japanese).

* cited by examiner

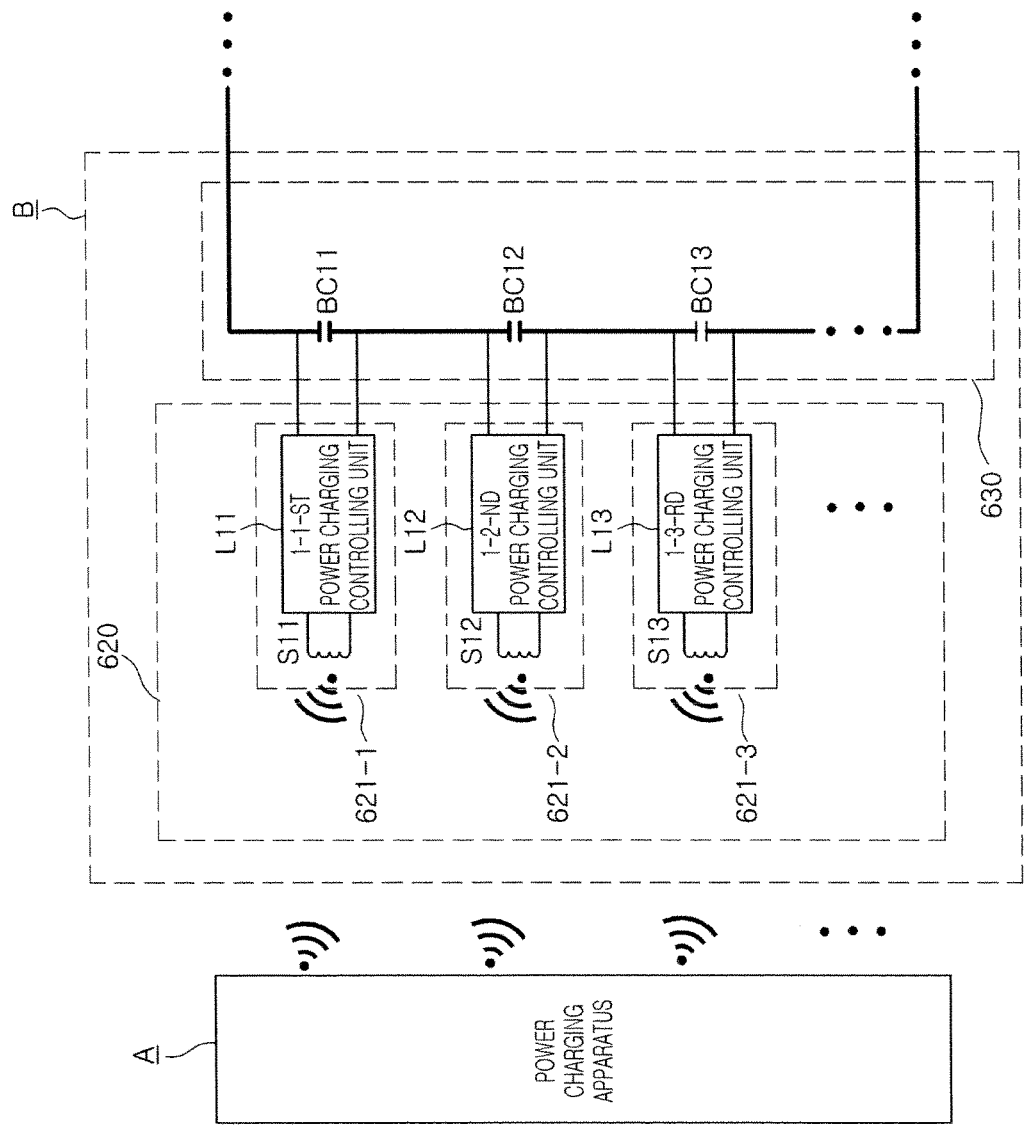

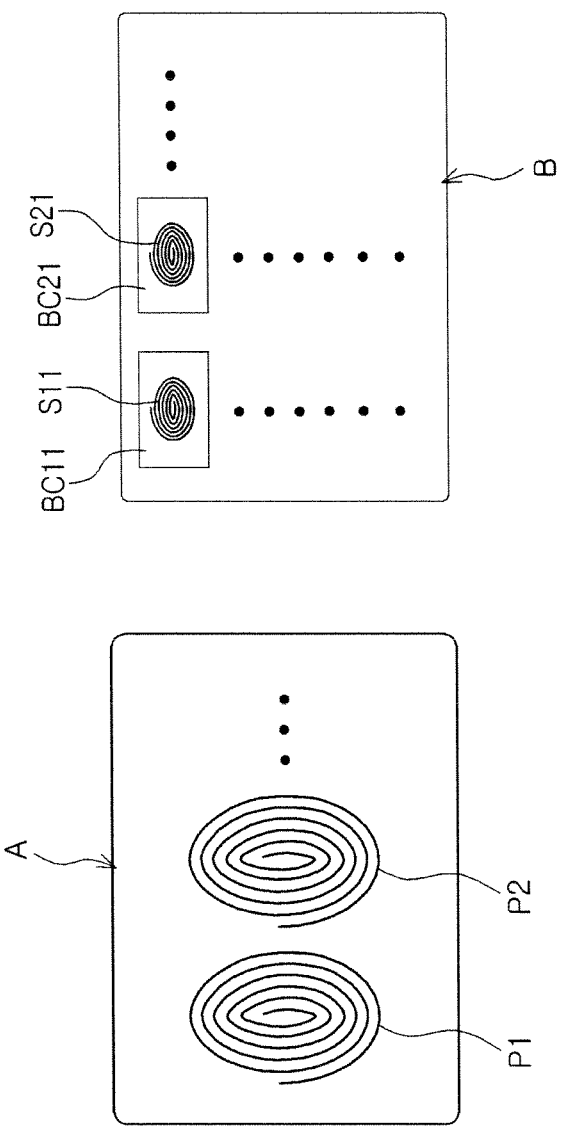

Before

By

After

| Tx1 | Tx2 |
|---|---|
| on | off |
| off | on |

FIG. 9A

| Tx1 | Tx2 |
|---|---|
| FIXED | VARIED |
| VARIED | FIXED |

FIG. 9B

NON-CONTACT POWER SUPPLY APPARATUS, CHARGING APPARATUS, AND BATTERY APPARATUS

CROSS-REFERENCE TO RELATED APPLICATION

This application claims the priority and benefit of Korean Patent Application No. 10-2013-0167765 filed on Dec. 30, 2013, with the Korean Intellectual Property Office, the disclosure of which is incorporated herein by reference.

BACKGROUND

The present disclosure relates to a charging apparatus capable of wirelessly charging battery cells and a battery apparatus with electrical power.

Electric and electronic devices are devices operated using electricity as an energy source. A supply of electrical power, the energy source, is necessary to operate electric and electronic devices, and electric and electronic devices must receive externally-supplied power, unless such electric and electronic devices are able to generate power by themselves.

Therefore, in order for the electric and electronic device to receive externally-supplied power, a power supplying apparatus for transferring power generated by an external power generating facility to the electric and electronic device is required. As the power supplying apparatus, a wired type power supplying device directly connected to the electronic device by a lead, or the like, to supply the power to a battery embedded in the electronic device is commonly used. Alternatively, the power may be supplied to the battery embedded in the electronic device using a non-contact scheme employing a magnetic induction effect or a magnetic resonance effect as described.

However, a need exists for a technology for balancing power levels between battery cells and significantly increasing efficiency in an effective current of battery cells, in the case in which the power is supplied to a battery embedded in the electronic device using a non-contact scheme by employing a magnetic induction effect or a magnetic resonance effect.

SUMMARY

Some embodiments in the present disclosure may provide a non-contact power supply apparatus that is capable of maintaining a balance in power between battery cells by charging each battery cell with power or is capable of rapidly charging battery cells with power by wirelessly transmitting power at maximum allowable current levels of the battery cells, a charging apparatus, and a battery apparatus.

According to some embodiments in the present disclosure, a non-contact power supply apparatus may include: a power conversion unit, converting input power into output power; and a power transmitting coil unit transmitting the output power to a plurality of battery cells in a non-contact manner, respectively, wherein the power conversion unit adjusts a level of the output power such that a voltage level of power received by at least one battery cell, among the plurality of battery cells, is within a preset reference voltage range.

According to some embodiments in the present disclosure, a non-contact power supply apparatus may include: a power conversion unit, converting input power into output power; and a power transmitting coil unit transmitting the output power to a plurality of battery cells in a non-contact manner, respectively, wherein the power conversion unit adjusts a level of the output power such that a current level of power received by at least one battery cell, among the plurality of battery cells, is within a maximum allowable charging current level of a corresponding battery cell.

According to some embodiments in the present disclosure, a charging apparatus may include a plurality of charging units. Each of the plurality of charging units may include: a power receiving coil receiving output power transmitted from a power transmitting side in a non-contact manner; a rectifying unit rectifying the received power; and a controlling unit controlling power charging by converting the rectified power into a charging power having a level appropriate for a corresponding battery cell, wherein among the plurality of charging units, at least one charging unit wirelessly transmits power state information to the power transmitting side such that a voltage level of the received power is within a preset reference voltage range.

According to some embodiments in the present disclosure, a charging apparatus may include a plurality of charging units. Each of the plurality of charging units may include: a power receiving coil receiving, as received power, output power transmitted from a power transmitting side in a non-contact manner; a rectifying unit rectifying the received power; and a controlling unit controlling power charging by converting the rectified power into charging power having a level appropriate for a corresponding battery cell, wherein among the plurality of charging units, at least one charging unit wirelessly transmits power state information to the power transmitting side such that a current level of the received power is within a maximum allowable charging current level of a corresponding battery cell.

According to some embodiments in the present disclosure, a battery apparatus may include: at least one battery cell group including a plurality of battery cells, respectively; and a plurality of charging units corresponding to the plurality of battery cells of the at least one battery cell group in a one-to-one scheme, receiving power transmitted from a power transmitting side in a non-contact manner, and charging a corresponding battery cell with the received power, wherein among the plurality of charging units, at least one charging unit wirelessly transmits power state information to the power transmitting side such that a voltage level of the received power is within a preset reference voltage range.

According to some embodiments in the present disclosure, a battery apparatus may include: at least one battery cell group including a plurality of battery cells; and a plurality of charging units corresponding to the plurality of battery cells of the at least one battery cell group in a one-to-one scheme, receiving power transmitted from a power transmitting side in a non-contact manner, and charging a corresponding battery cell with the received power, wherein among the plurality of charging units, at least one charging unit wirelessly transmits power state information to the power transmitting side such that a current level of the received power is within a maximum allowable charging current level of a corresponding battery cell.

BRIEF DESCRIPTION OF DRAWINGS

The above and other aspects, features and other advantages of the present disclosure will be more clearly understood from the following detailed description taken in conjunction with the accompanying drawings, in which:

FIGS. 6A through 6G are views illustrating examples and applications of a battery apparatus according to an exemplary embodiment of the present disclosure; and FIGS. 7A through 7D, FIGS. 8A through 8D, and FIGS. 9A and 9B are views illustrating a charging operation according to an exemplary embodiment of the present disclosure.

DETAILED DESCRIPTION

Figure 1A:
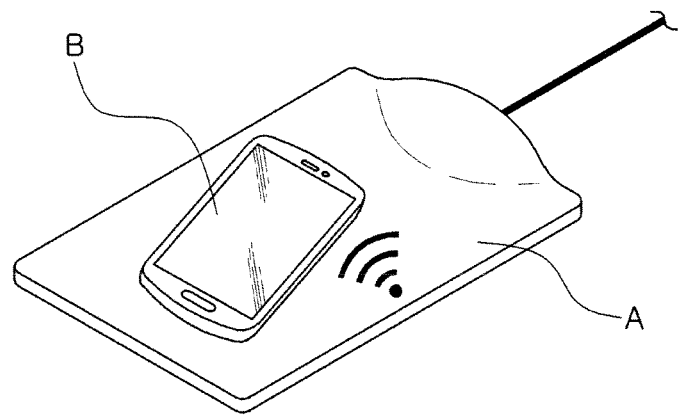
FIGS. 1A through 1D are views illustrating applications of a non-contact power supply apparatus according to an exemplary embodiment of the present disclosure.
Figure 1B:
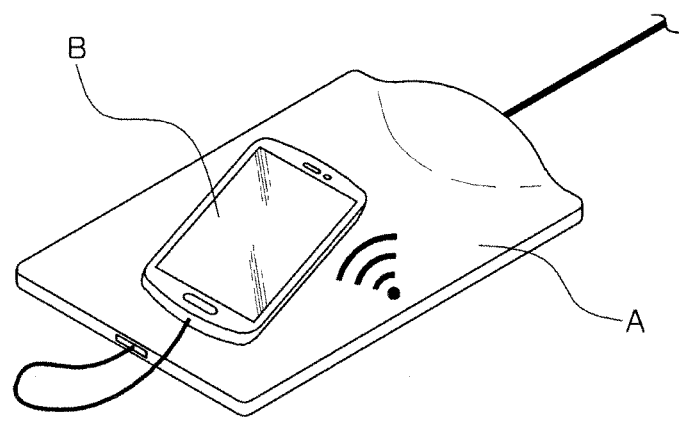

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIGS. 1A through 1D are views illustrating applications of a non-contact power supply apparatus according to an exemplary embodiment of the present disclosure.

Referring to FIGS. 1A through 1D, a non-contact power supply apparatus A according to an exemplary embodiment of the present disclosure may charge respective battery cells of a cellular phone, a tablet personal computer (PC), a laptop PC, or the like, including a battery apparatus B having a plurality of battery cells, with power, in a wired or wireless scheme. In addition, the non-contact power supply apparatus A according to an exemplary embodiment of the present disclosure may charge respective apparatuses among a plurality of cellular phones, tablet PCs, laptop PCs, or the like, having battery apparatuses B1 and B2 with at least one battery cell, with power, in a wired or wireless scheme.

Figure 2:
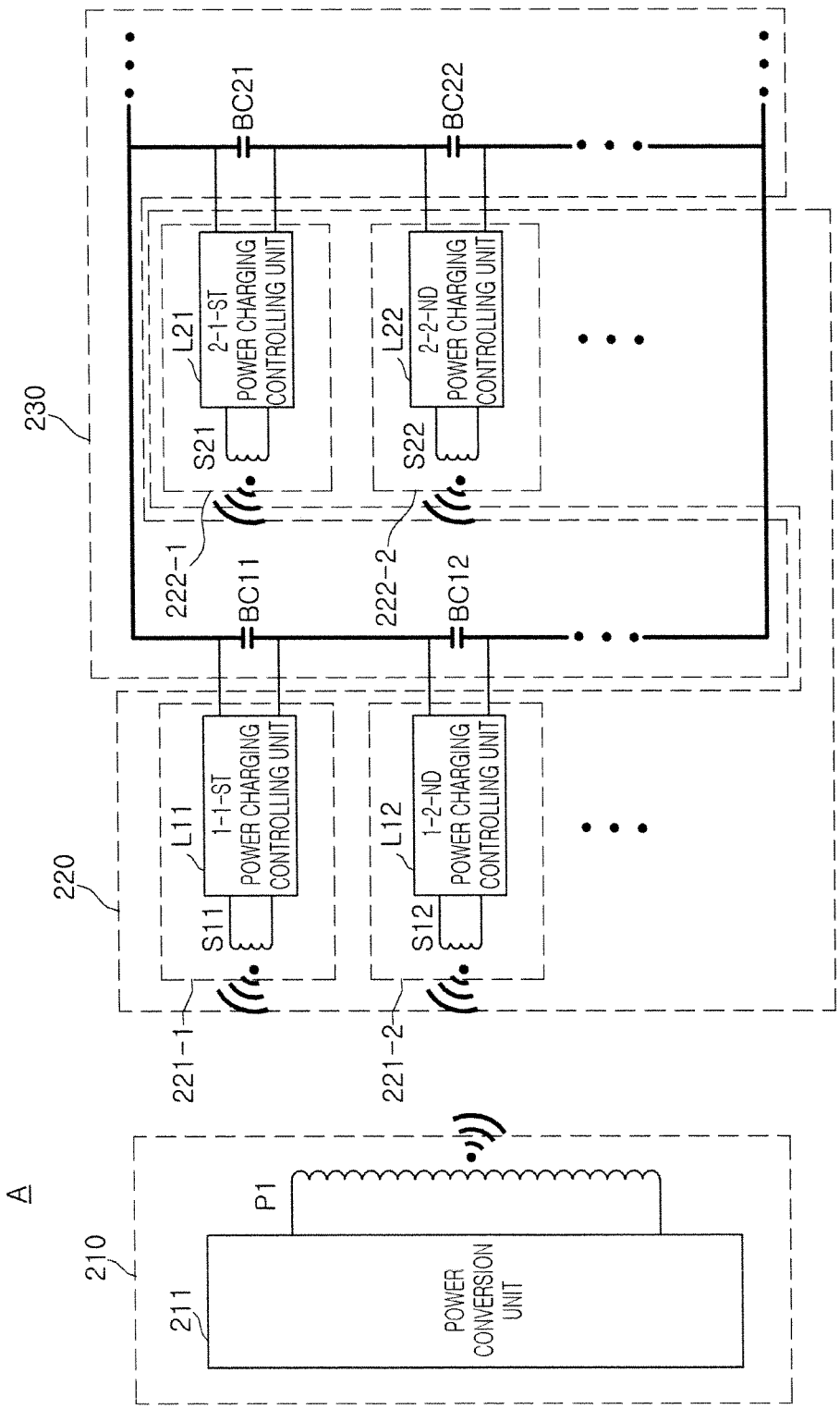
FIGS. 2 and 3 are diagrams schematically illustrating first and second examples of a non-contact power supply apparatus according to an exemplary embodiment of the present disclosure.
Figure 3:
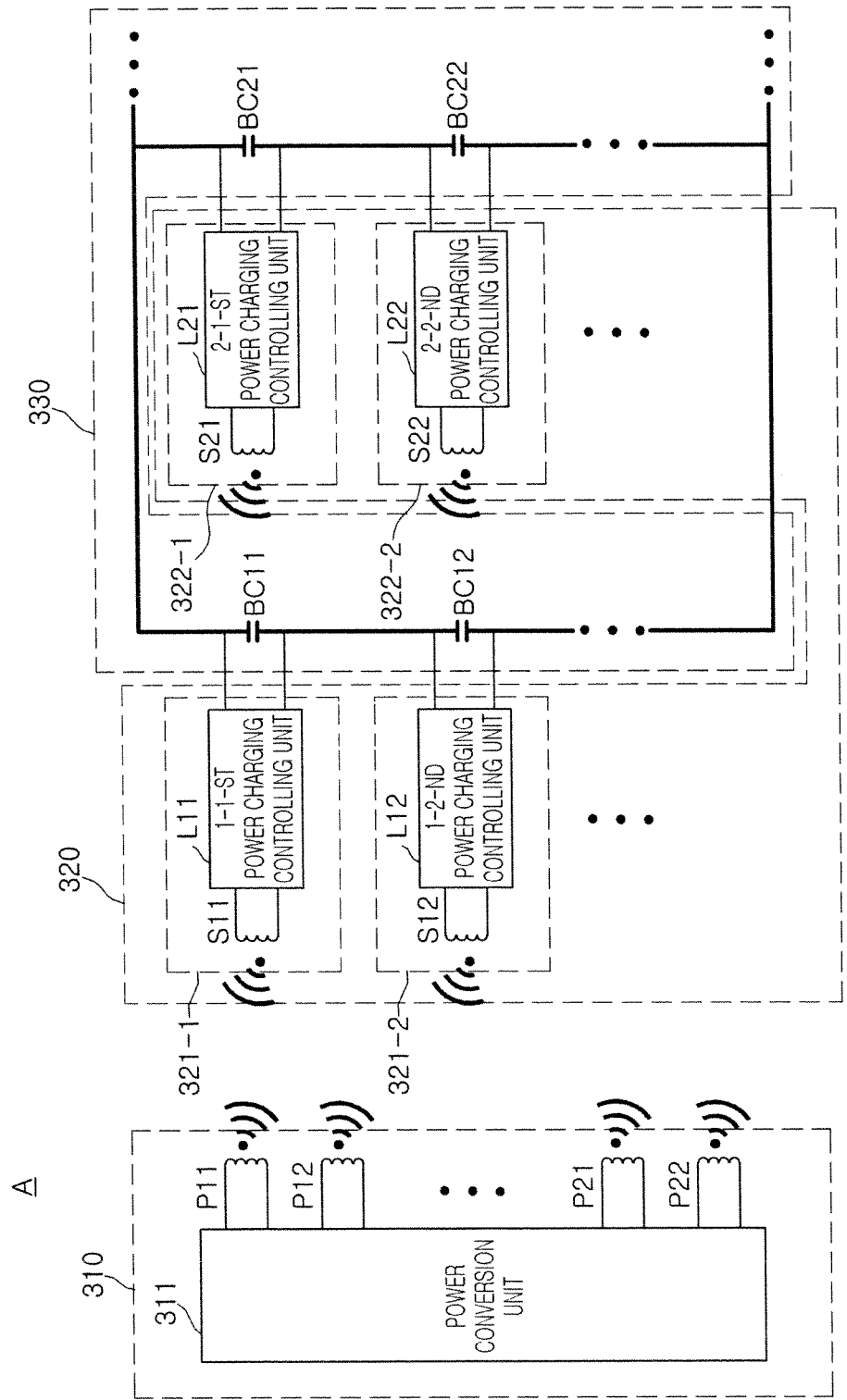

FIGS. 2 and 3 are diagrams schematically illustrating first and second examples of a non-contact power supply apparatus according to an exemplary embodiment of the present disclosure.

Referring to FIGS. 2 and 3, the non-contact power supply apparatus A, according to an exemplary embodiment of the present disclosure e, may transmit power in a non-contact manner using a power supplying unit 210 or 310. To this end, the power supplying unit 210 or 310 may include a power conversion unit 211 or 311 converting input power into output power and a power transmitting coil P1 or power transmitting coils P11, P12, P21, and P22 transmitting the output power from the power conversion unit 211 or 311 in a non-contact manner.

Here, the non-contact manner may indicate a scheme in which the transmission of power from a power transmitting side to a power receiving side is not performed via a direct connection between conductive elements on the power transmitting side and the power receiving side, and in other words, may refer to a non-contact scheme, a wireless transmission scheme, or the like.

The power supplying unit 210 or 310 of the non-contact power supply apparatus A according to an exemplary embodiment of the present disclosure may include one power transmitting coil P1 as illustrated in FIG. 2 or include a plurality of power transmitting coils P11, P12, P21, and P22 as illustrated in FIG. 3 in order to improve power transmission efficiency, and the number of the plurality of power transmitting coils P11, P12, P21, and P22 may correspond to that of power receiving coils S11, S12, S21, and S22.

On the other hand, a charging unit 220 or 320 of a charging apparatus or a battery apparatus B may include a plurality of charging units 221-1, 221-2, 222-1, and 222-2 or 321-1, 321-2, 322-1, and 322-2 corresponding to a plurality of battery cells BC11, BC12, BC21, and BC22 of a battery unit 230 or 330 in a one-to-one scheme, and the plurality of charging units 221-1, 221-2, 222-1, and 222-2 or 321-1, 321-2, 322-1, and 322-2 may include the power receiving coils S11, S12, S21, and S22 and power charging controlling units L11, L12, L21, and L22, respectively, in order to charge corresponding battery cells BC11, BC12, BC21, and BC22, with power, respectively.

The power receiving coils S11, S12, S21, and S22 may receive power from the power transmitting coil P1 or the power transmitting coils P11, P12, P21, and P22 of the power supplying unit 210 or 310 in a non-contact manner such as a magnetic induction scheme or a magnetic resonance scheme, and the power charging controlling units L11, L12, L21, and L22 may perform controlling to allow the corresponding battery cells BC11, BC12, BC21, and BC22 to be charged with power from the power receiving coils S11, S12, S21, and S22, respectively, to allow a current level of the power with which corresponding battery cells are being charged to be maintained at a maximum allowable current level of the battery cells in the case that rapid power charging of a battery is performed, and to allow a current level of power with which the corresponding battery cells are being charged to be maintained at a maximum allowable current level or lower when the corresponding battery cells approach a fully charged state.

For example, each of a 1-1-st power charging controlling unit L11, a 1-2-nd power charging controlling unit L12, a 2-1-st power charging controlling unit L21, and a 2-2-nd power charging controlling unit L22 may perform controlling to maintain the current level of the power charged in the corresponding battery cells at the maximum allowable current level of the battery cells in the case of the rapid power charging of corresponding battery cells BC11, BC12, BC21 and BC22, and maintain the current level of the power charged in the corresponding battery cells as the current level of the maximum allowable current or less in the case in which the corresponding battery cells approach the fully charged state.

FIGS. 4A through 4D are circuit diagrams schematically illustrating first to fourth examples of a power supplying unit used in the non-contact power supply apparatus according to an exemplary embodiment of the present disclosure.

The power supplying unit 210 may include a power conversion unit 211 converting input power into output power and power transmitting coils P1 to Pn.

The power conversion unit 211 may include a switching unit 111b, a switching controlling unit 111a, and a communications unit 111c, and the switching unit 111b may be electrically connected to the power transmitting coil P1 or the power transmitting coils P1 to Pn, convert an input power into output power, and transmit the power through the power transmitting coil P1 or the power transmitting coils P1 to Pn in a non-contact manner, and the switching controlling unit 111a may provide switching control signals SS1 and SS2 or SS1 to SS4 for controlling the switching of the switching unit 111b.

The communications unit 111c may receive power charging state information from a target charging device and provide the power charging state information to the switching controlling unit 111a to allow the switching controlling unit 111a to control a switching duty, on and off switching times, and the like, thereby performing functions such as a rapid power charging, and maintaining a balance in power between battery cells.

Figure 4A:
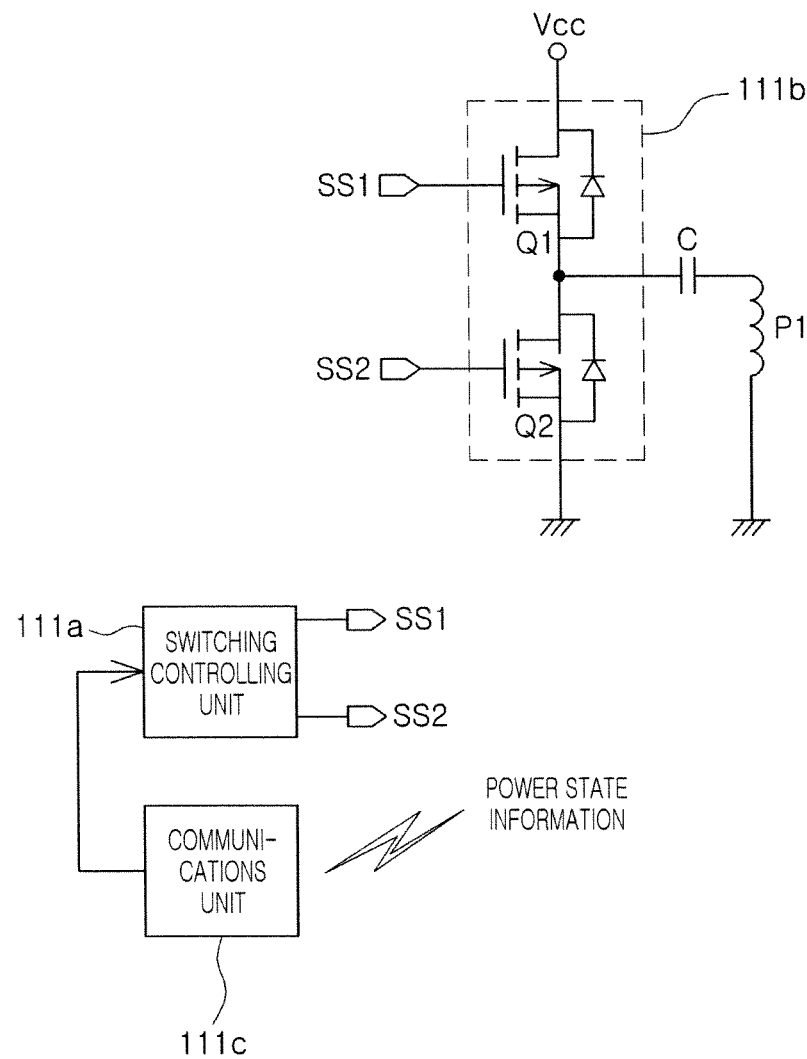
FIGS. 4A through 4D are circuit diagrams schematically illustrating first to fourth examples of a power supplying unit used in the non-contact power supply apparatus according to an exemplary embodiment of the present disclosure.
Figure 4B:
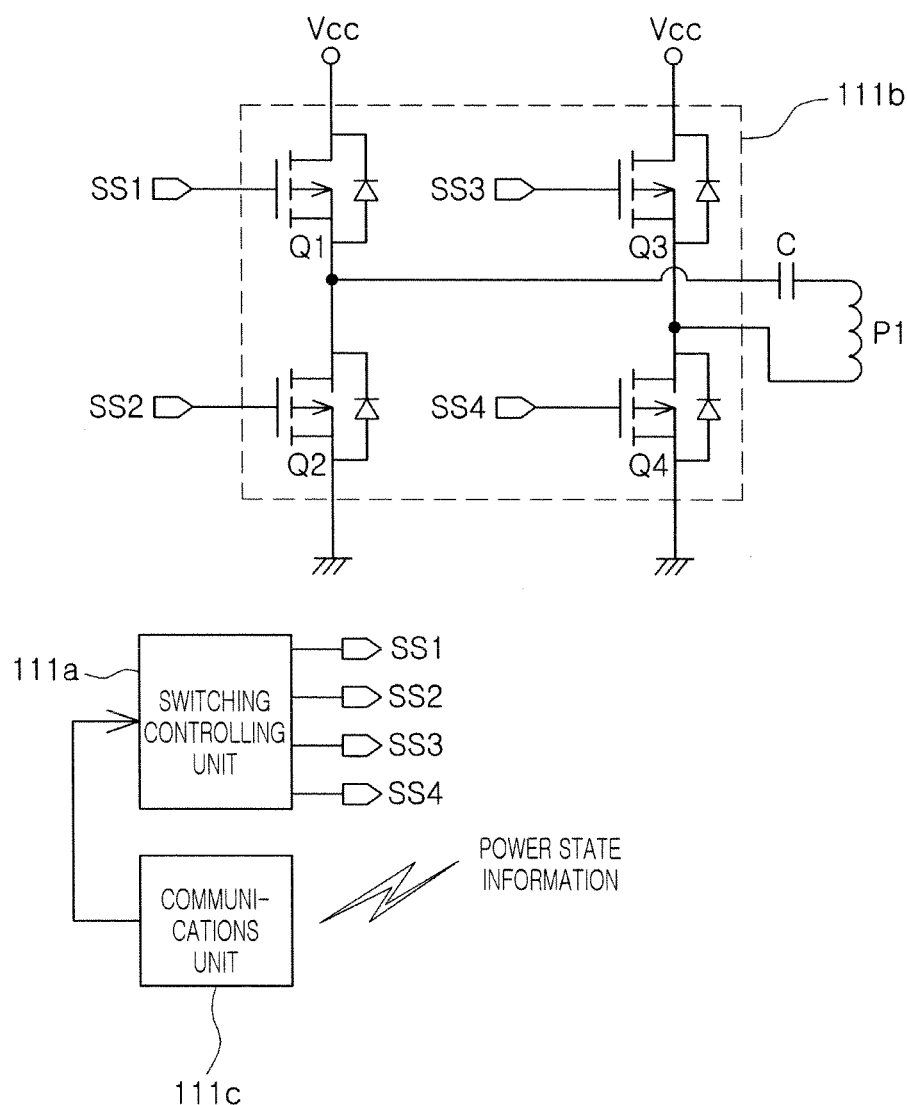

The switching unit 111b may include at least two switches Q1 and Q2 as illustrated in FIG. 4A, and the respective switches Q1 and Q2 may be implemented with a field effect transistor (FET), but are not limited thereto. The at least two switches Q1 and Q2 may have a half bridge switch structure or a full bridge switch structure as illustrated in FIG. 4B. However, the at least two switches Q1 and Q2 are not limited thereto, but may be variously configured. The switches Q1 and Q2 may have a driving power Vcc supplied thereto, and a voltage level of the supplied driving power Vcc may be fixed or varied.

Figure 4C:
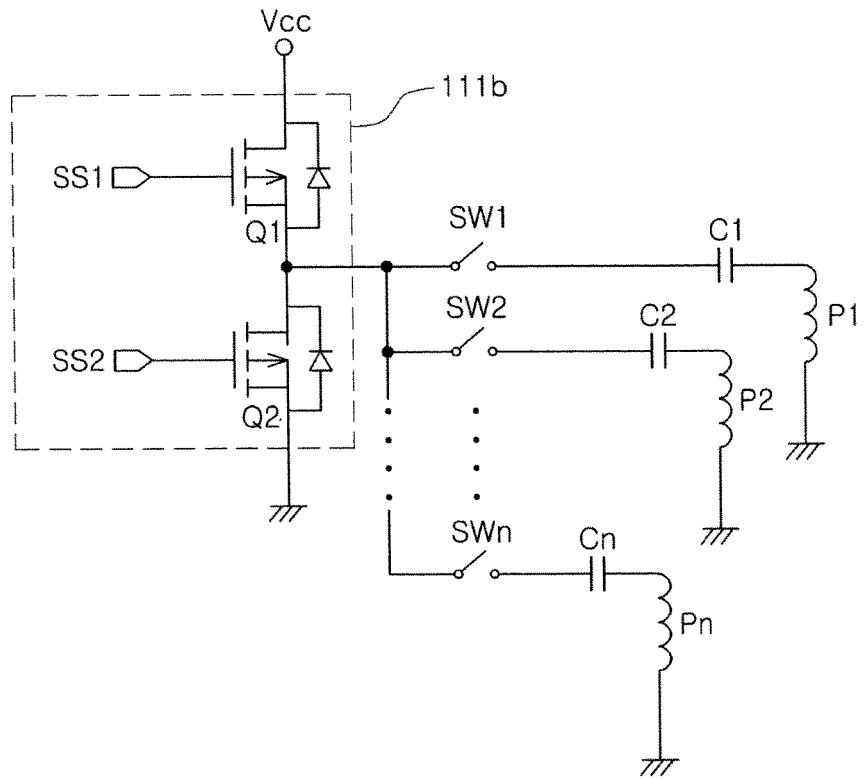

Referring to FIG. 4C, as an example of the power supplying unit used in the charging apparatus according to an exemplary embodiment of the present disclosure, a plurality of power transmitting coils P1, P2, and Pn may be connected to one half bridge Q1 and Q2, and switches SW1, SW2, and SWn may be disposed between one half bridge Q1 and Q2 and the plurality of power transmitting coils P1, P2, and Pn, respectively, in order to form a connection therebetween. The switches SW1, SW2, and SWn may be switched in response to control signals, to connect the half bridge switch Q1 and Q2 and the corresponding power transmitting coils to each other. For example, a plurality of switches SW1, SW2, and SWn may be sequentially switched on and off, depending on the control signals, to thereby be connected to the corresponding power transmitting coils. The control signals may also be provided from the switching controlling unit 111a, and connection of the corresponding power transmitting coils may be based on the power charging state information from the communications unit 111c.

Figure 4D:
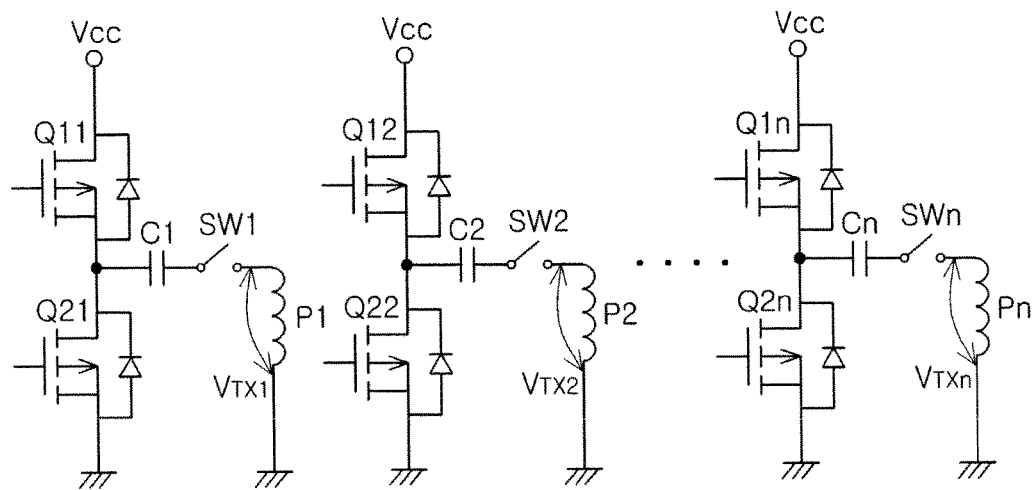
Figure 5A:
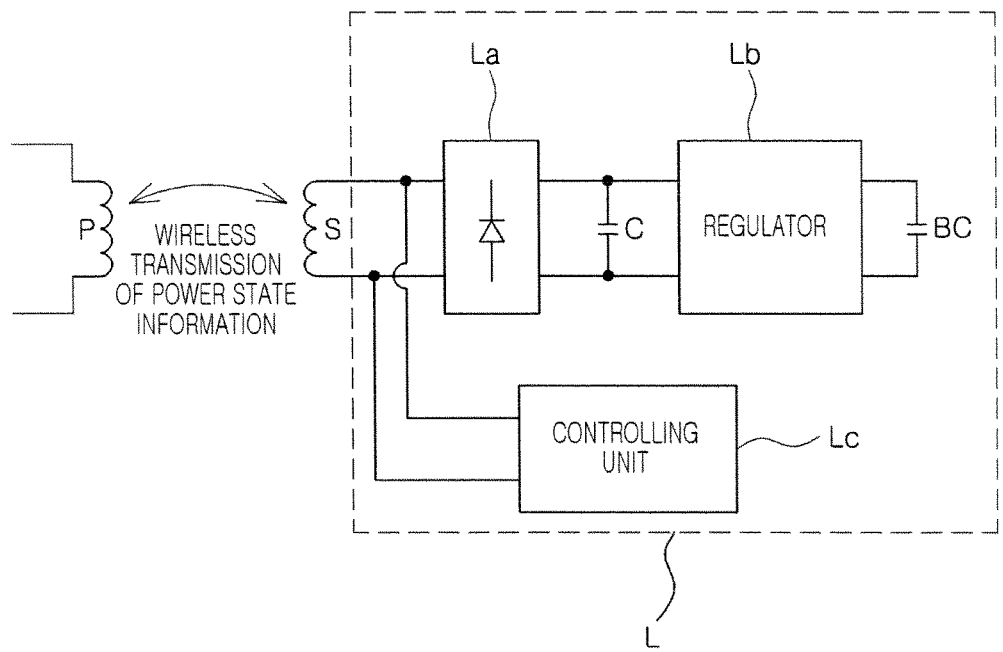
FIGS. 5A through 5D are circuit diagrams schematically illustrating first to fourth examples of a charging unit according to an exemplary embodiment of the present disclosure.
Figure 5B:
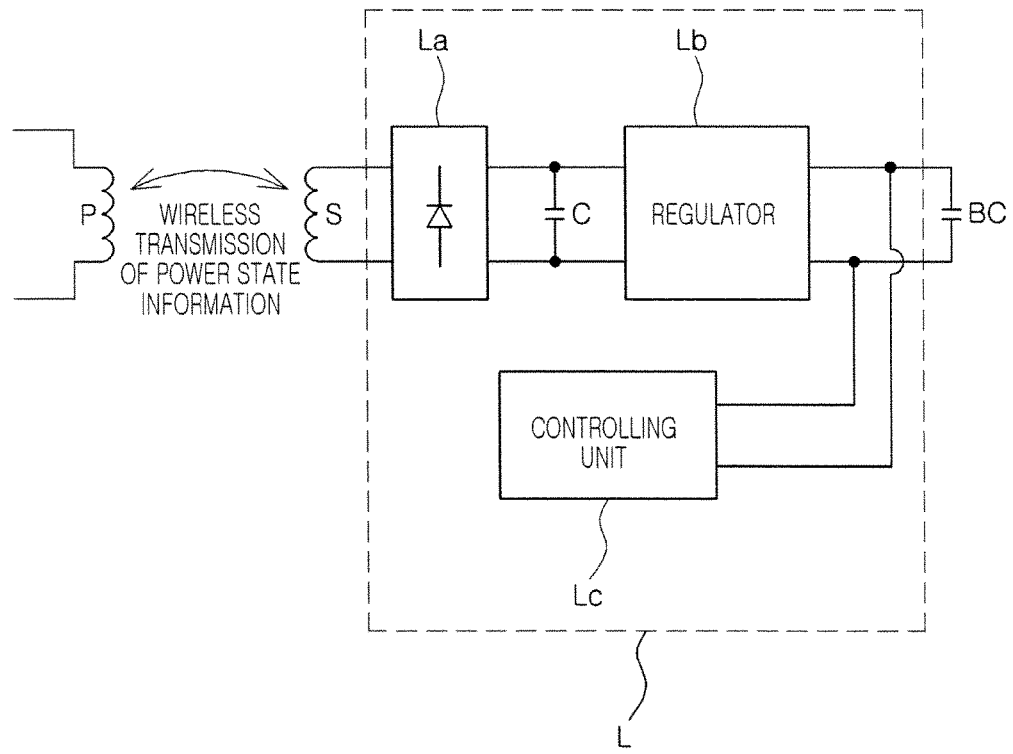
Figure 5C:
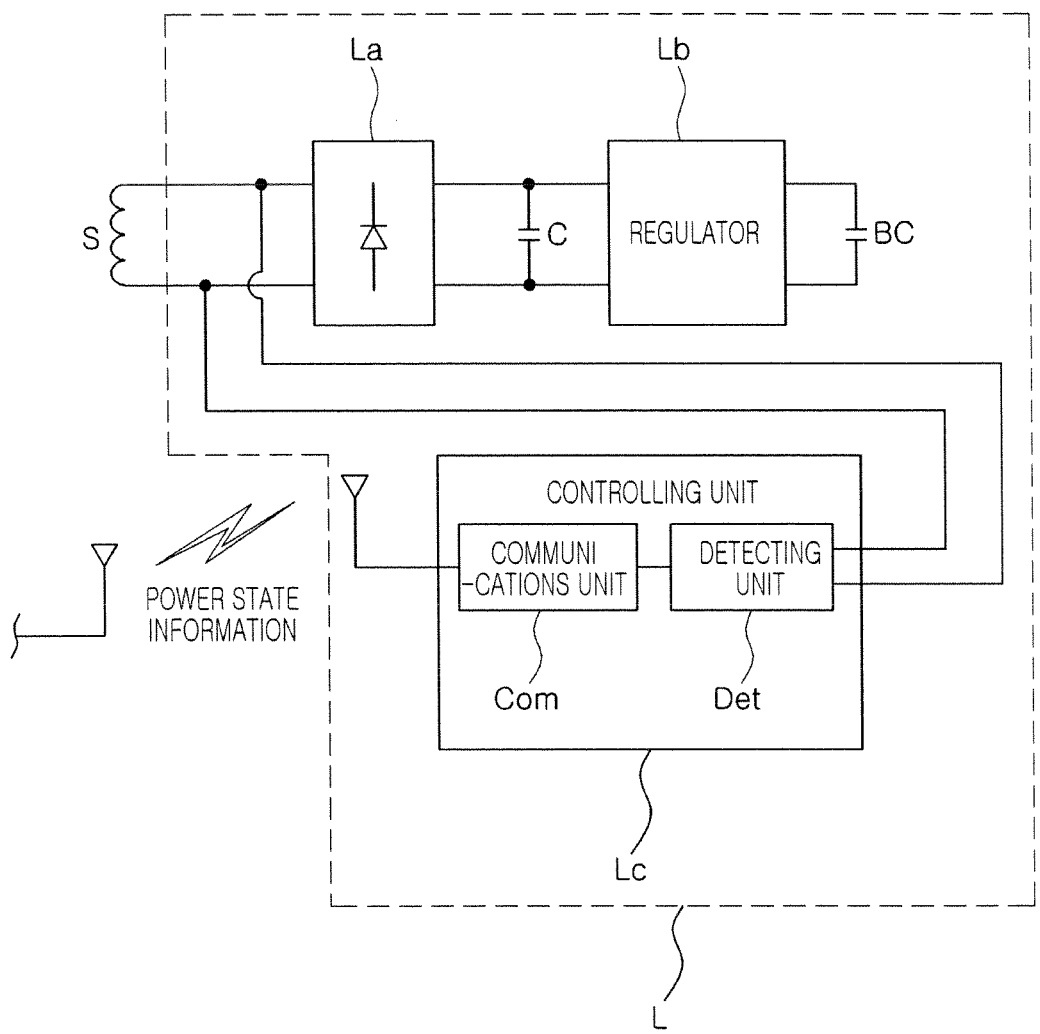
Figure 5D:
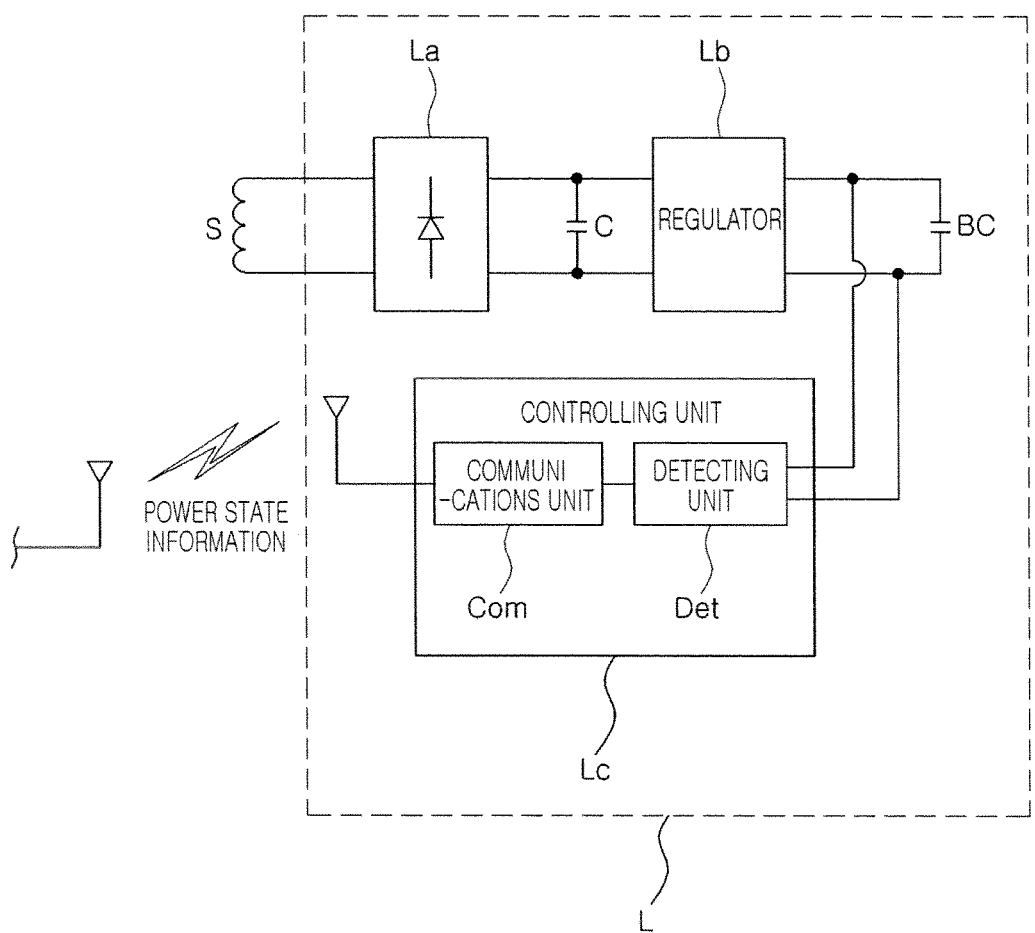

On the other hand, referring to FIG. 4D, a plurality of switching circuits may be connected to the plurality of corresponding power transmitting coils P1, P2, and Pn, respectively. The plurality of switching circuits may be half bridge switches Q11, Q012, Q1n, Q21, Q22, and Q2n, and the half bridge switches Q11, Q12, Q1n, Q21, Q22, and Q2n may be connected to the power transmitting coils P1, P2, and Pn in a one-to-one correspondence scheme.

Likewise, the half bridge switches Q11, Q12, Q1n, Q21, Q22, and Q2n may be replaced with various switch structures such as one switch, a full bridge switch, a push-pull switch, and the like. Referring to FIGS. 4A through 4D, although capacitors C1 to Cn are illustrated between the power transmitting coil P1 or the power transmitting coils P1 to Pn and the switching unit 111b, the capacitors C1 to Cn may not be used, depending on a transmission scheme, or a plurality of capacitors may be connected to each other in parallel.

FIGS. 5A through 5D are circuit diagrams schematically illustrating first to fourth examples of a charging unit according to an exemplary embodiment of the present disclosure.

Referring to FIGS. 5A through 5D, the charging unit according to an exemplary embodiment of the present disclosure may include a power receiving coil S and a power charging controlling unit.

The power receiving coil S may receive the power from the corresponding power transmitting coil of the power supplying unit in a non-contact manner, and the power charging controlling unit L may control the received power and charge the received power in a corresponding battery cell.

The power charging controlling unit L may include a rectifying unit La, a regulator Lb, and a controlling unit Lc.

The rectifying unit La may rectify the power from the power receiving coil S, and the regulator Lb may regulate the rectified power into a power appropriate for charging to control the power charging of the corresponding battery cell. The controlling unit Lc may detect a state of the power transmitted to the power receiving coil S and transmit power state information to the power supplying unit in a non-contact manner.

To this end, the controlling unit Lc may detect the state of the power from the power receiving coil S or the power transferred from the regulator Lb to the battery cell.

Meanwhile, the controlling unit Lc may transmit the power state information having a pulse form to a power transmitting side through the power receiving coil S in a non-contact manner, and may include a separate communications unit Com to transmit the power state information detected by a detecting unit Det to the power transmitting side through the communications unit Com in a preset communications scheme.

FIGS. 6A through 6G are views illustrating examples and applications of a battery apparatus according to an exemplary embodiment of the present disclosure.

Referring to FIG. 6A, in a first example of a battery apparatus B according to an exemplary embodiment of the present disclosure, a charging unit 620 may include a plurality of charging units 621-1, 621-2, and 621-3, a battery unit 630 may include at least one battery cell group, and the at least one battery cell group may include a plurality of battery cells connected to each other in series.

The plurality of charging units 621-1, 621-2, and 621-3 may correspond to the battery cells BC11, BC12 and BC13 of at least one battery cell group, respectively, in a one-to-one scheme, and the respective power charging controlling units L11, L12, and L13 may perform controlling to allow a current level of power with which corresponding battery cells BC11, BC12, and BC13 are being charged to be maintained at the maximum allowable current level of the battery cells in the case of rapid power charging of the corresponding battery cells and allow the current level of the power with which the corresponding battery cells are being charged to be maintained at a current level of the maximum allowable currents or less in the case in which the corresponding battery cells approach a fully charged state.

Figure 6B:
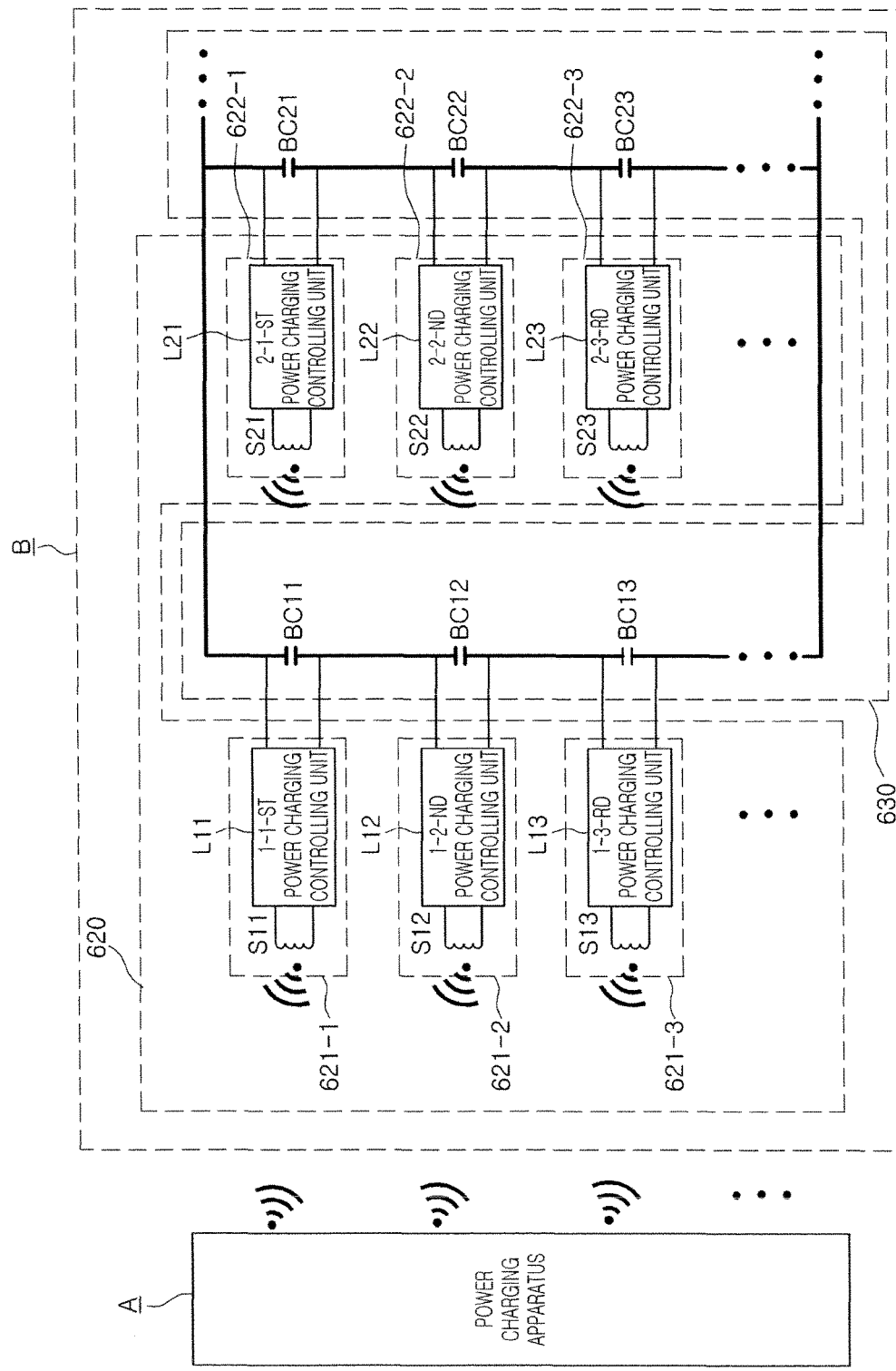
Figure 6C:
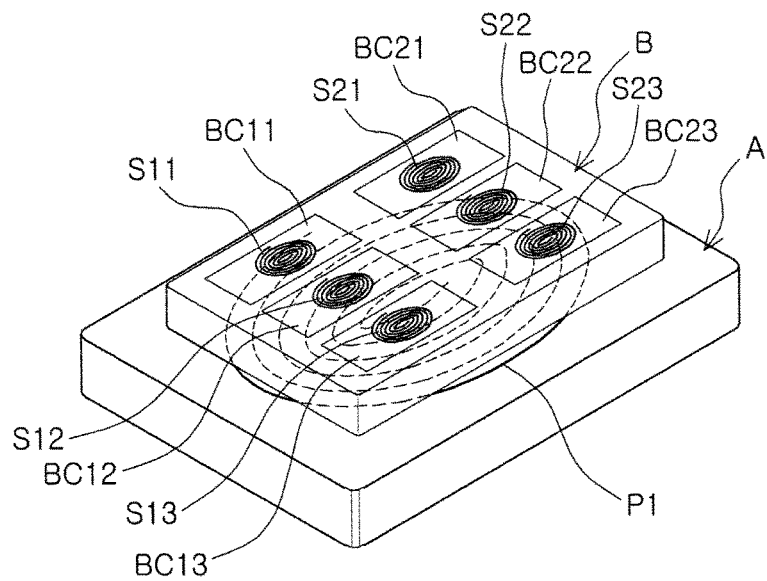
Figure 6D:
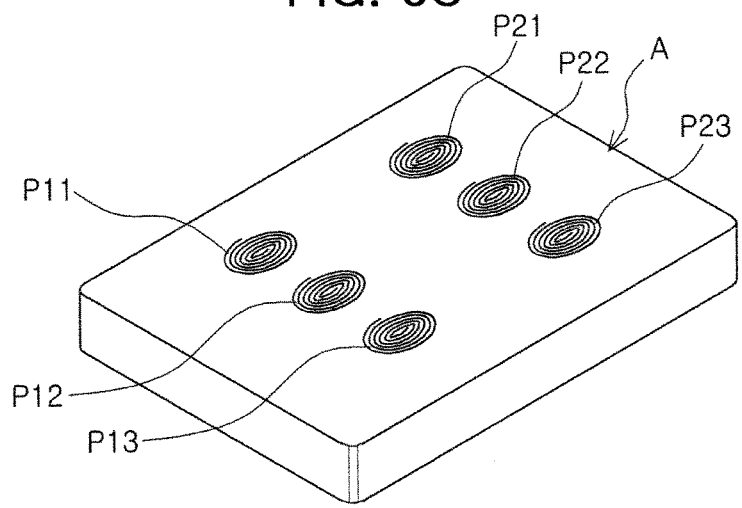
Figure 6E:
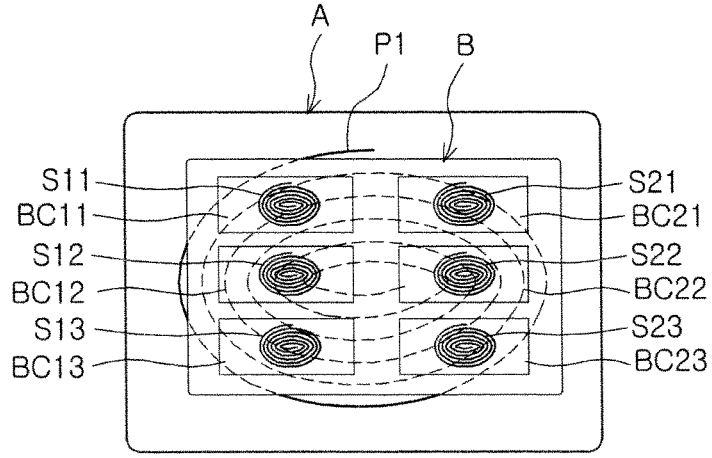
Figure 6F:
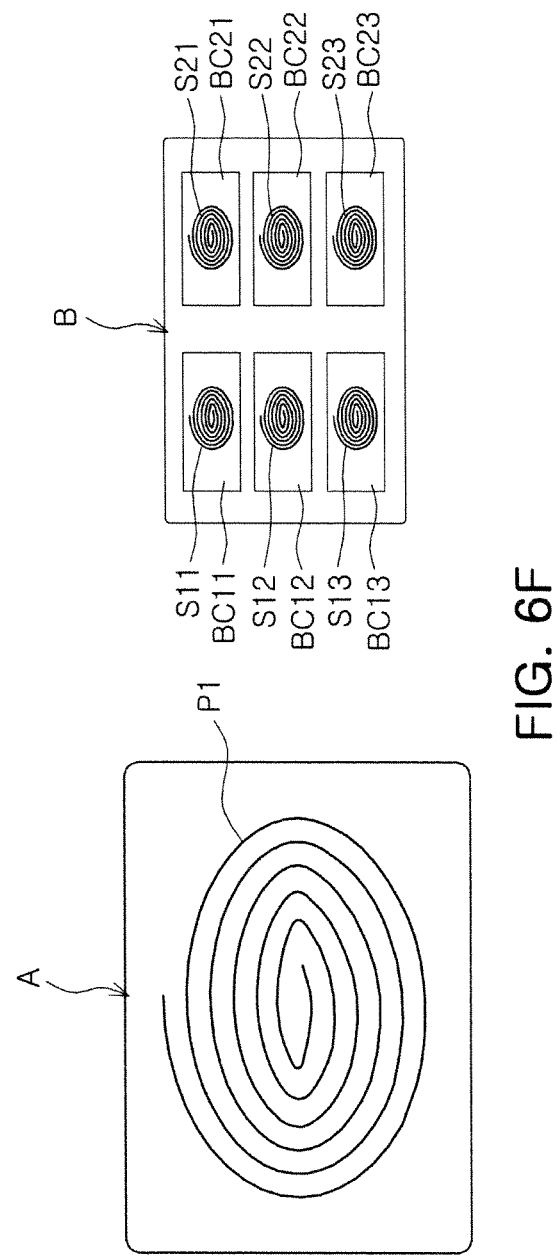

Referring to FIG. 6B, in a second example of a battery device B according to an exemplary embodiment of the present disclosure, a charging unit 620 may include a plurality of charging units 621-1, 621-2, 621-3, 622-1, 622-2, and 622-3. Here, the plurality of charging units 621-1, 621-2, 621-3, 622-1, 622-2, and 622-3 may receive the power from the charging apparatus A in a non-contact manner. The plurality of charging units 621-1, 621-2, 621-3, 622-1, 622-2, and 622-3 may correspond to a plurality of battery cells BC11, BC12, BC13, BC21, BC22, and BC23 of a battery unit 630, respectively, in a one-to-one scheme, and may charge corresponding battery cells BC11, BC12, BC13, BC21, BC22, and BC23, with power, respectively.

The plurality of charging units 621-1, 621-2, 621-3, 622-1, 622-2, and 622-3 may include power charging controlling units L11, L12, L13, L21, L22, and L23, respectively, and a 1-1-st power charging controlling unit L11, a 1-2-nd power charging controlling unit L12, a 1-3-rd power charging controlling unit L13, a 2-1-st power charging controlling unit L21, a 2-2-nd power charging controlling unit L22, and a 2-3-rd power charging controlling unit L23 may respectively perform controlling to allow a current level of power with which corresponding battery cells BC11, BC12, BC13, BC21, BC22, and BC23 are being charged to be maintained at the maximum allowable current level of the battery cells in the case of rapid power charging of the corresponding battery cells and allow the current level of the power with which the corresponding battery cells are being charged to be maintained at a current level of the maximum allowable current or less in the case in which the corresponding battery cells approach a fully charged state.

The battery unit 630 may include a plurality of battery cell groups connected to each other in parallel, and the plurality of battery cell groups may include a plurality of battery cells BC11, BC12, and BC13, and a plurality of battery cells BC21, BC22, and BC23 connected to each other in series, respectively.

Referring to FIGS. 6C through 6G, in the battery apparatus B according to an exemplary embodiment of the present disclosure, for example, six battery cells BC11 to BC23 may be used, and three battery cells BC11, BC12, and BC13 and three battery cells BC21, BC22, and BC23 of the six battery cells BC11 to BC23 may be connected to each other in series, respectively, to form one battery cell group, respectively, and two battery cells groups BC11, BC12, and BC13 and BC21, BC22, and BC23 may be configured so as to be connected to each other in parallel (although the battery apparatus B according to an exemplary embodiment of the present disclosure may be used in a cellular phone, a tablet PC, and a laptop PC, or the like, detailed drawings thereof will be omitted).

In addition, in the case in which the power is wirelessly received, six power receiving coils S11 to S23 respectively corresponding to the six battery cells BC11 to BC23 may be provided, and may wirelessly receive the power from the power transmitting coil P1 of the non-contact power supply apparatus A.

On the other hand, the non-contact power supply apparatus A may also include six power transmitting coils P11, P12, P13, P21, P22, and P23 corresponding to the six power receiving coils S11 to S23.

Further, referring to FIGS. 6A through 6D, generally, in a battery pack used in a laptop PC, six battery cells BC11 to BC23 may be used, and three battery cells BC11, BC12, and BC13 and three battery cells BC21, BC22, and BC23 of the six battery cells BC11 to BC23 may be connected to one another in series, respectively, to form a single battery cell group, respectively, and two battery cells groups BC11, BC12, and BC13 and BC21, BC22, and BC23 may be configured to be connected to each other in parallel. Therefore, although the case in which the battery apparatus B according to an exemplary embodiment of the present disclosure includes the six battery cells BC11 to BC 23, configured as the two battery cell groups BC11, BC12, and BC13 as well as BC21, BC22, and BC23 has been illustrated by way of example in FIG. 6G, at least two battery cells may also be connected to each other in parallel, a plurality of battery cell groups may also be connected to each other in parallel, and each of the plurality of battery cell groups may also include a plurality of battery cells connected to each other in series. As illustrated in FIG. 6G, the number of power transmitting coils P1 and P2 included in the charging apparatus A may also be plural.

Figure 1C:
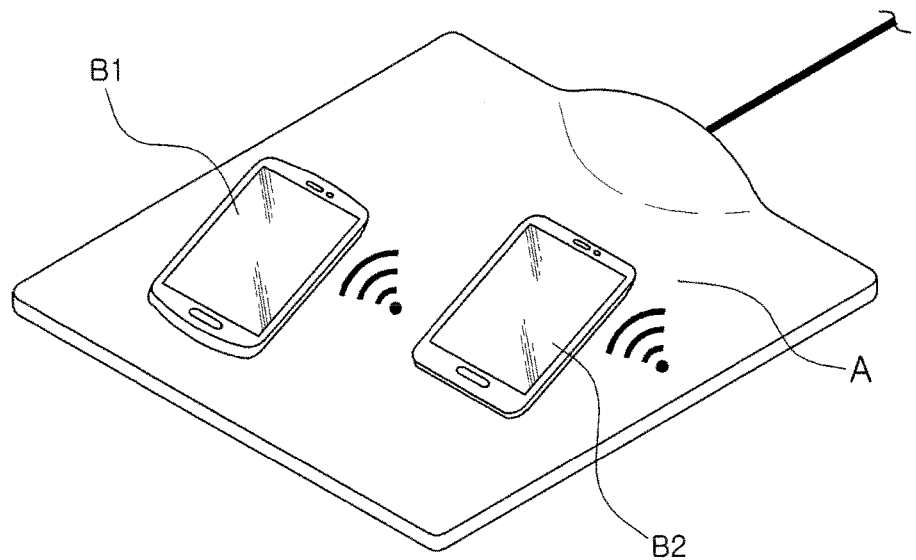
Figure 1D:
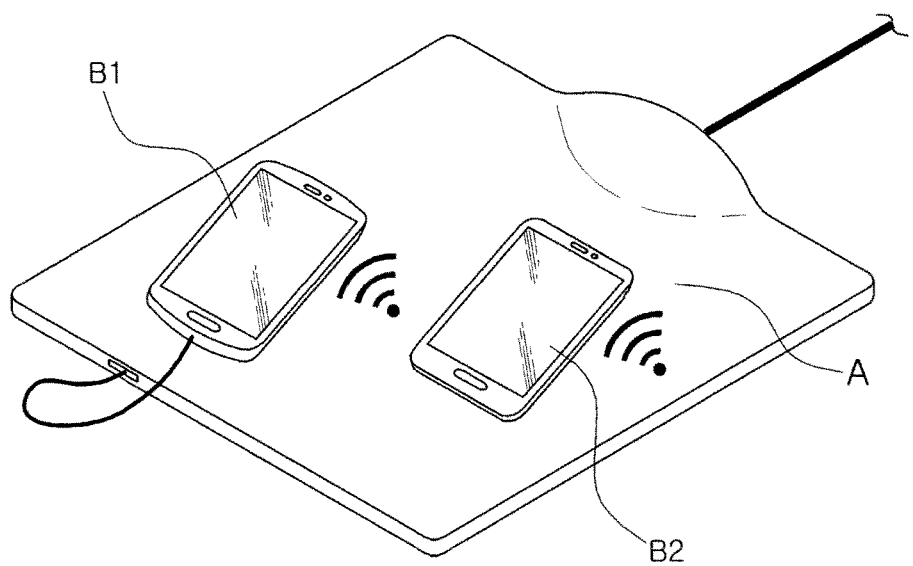

Referring to FIGS. 6A through 6G, although the battery apparatus B according to an exemplary embodiment of the present disclosure may be one apparatus, a plurality of battery apparatus B1 and B2 may be wirelessly charged with the power from the non-contact power supply apparatus A, as illustrated in FIGS. 1C and 1D, and each of the plurality of battery apparatuses B1 and B2 may include at least one charging unit and at least one battery cell. Here, since configurations of the at least one charging unit and the at least one battery cell have been described above, detailed descriptions thereof will be omitted.

FIGS. 7A through 7D, FIGS. 8A through 8D, and FIGS. 9A and 9B are views illustrating a power charging operation according to an exemplary embodiment of the present disclosure.

Referring to FIGS. 7A through 7D, amounts VRX1, VRX2, and VRX3 of power respectively transferred to the power receiving coils may be different from each other. Therefore, the power supplying unit may set the amounts VRX1, VRX2, and VRX3 of power transmitted from the power transmitting coils to the corresponding power receiving coils, so as to be respectively different from each other in the same power amount state, depending on the power state information.

Figure 7A:
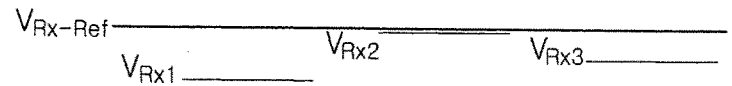
Figure 7A:
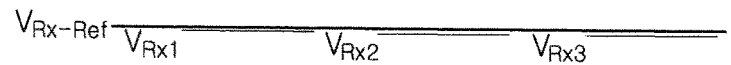
Figure 7A:
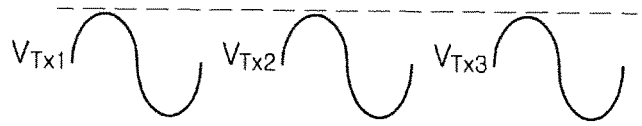
Figure 7A:
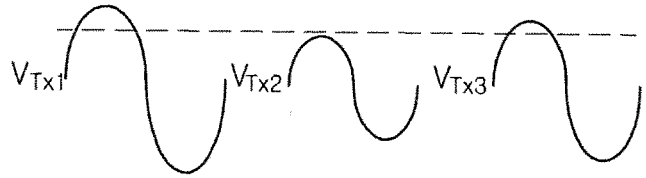

As illustrated in FIG. 7A, the power supplying unit may control transmission power so that the amounts of power received in the power receiving coils are constant, based on a maximum voltage VRX2 among the voltages VRX1, VRX2, and VRX3 received in the plurality of power receiving coils depending on the power state information from the charging unit. To the contrary, as illustrated in FIG. 7D, the power supplying unit may control transmission power so that the amounts of power received in the power receiving coils are constant based on a minimum voltage VRX2 among the voltages VRX1, VRX2, and VRX3 received in the plurality of power receiving coils.

Figure 7B:
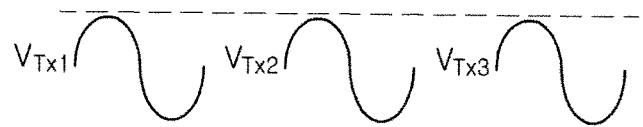
Figure 7B:
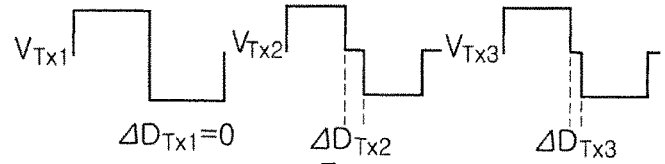
Figure 7B:
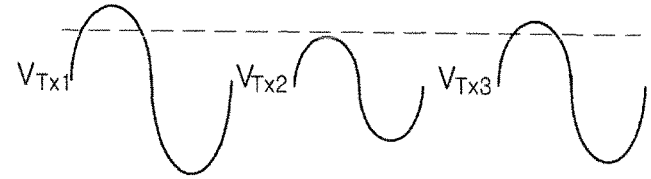
Figure 7C:
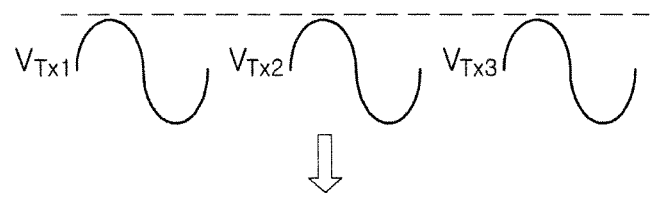
Figure 7C:
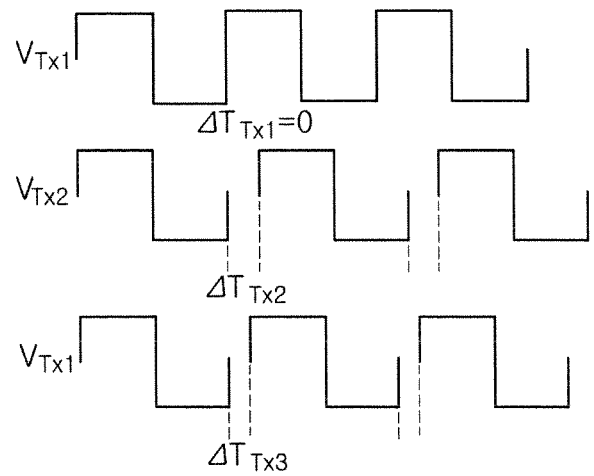
Figure 7C:
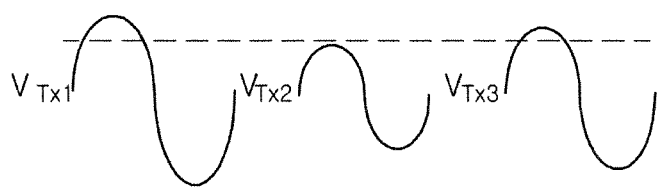
Figure 7D:
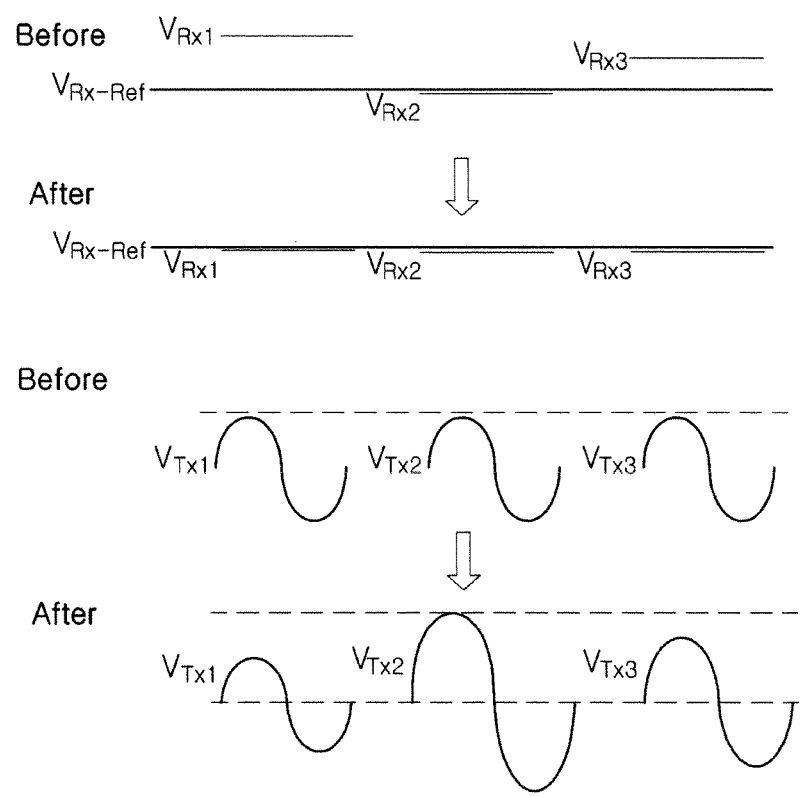

In order to control the amount of power transmitted from the respective power transmitting coils, switching on duties or switching off duties of the corresponding switching circuits may be controlled, as illustrated in FIG. 7B, or switching dead times of the corresponding switching circuits may be controlled, as illustrated in FIG. 7C.

The above-mentioned operation will be described in more detail with reference to FIGS. 8A through 8D.

Figure 8A:
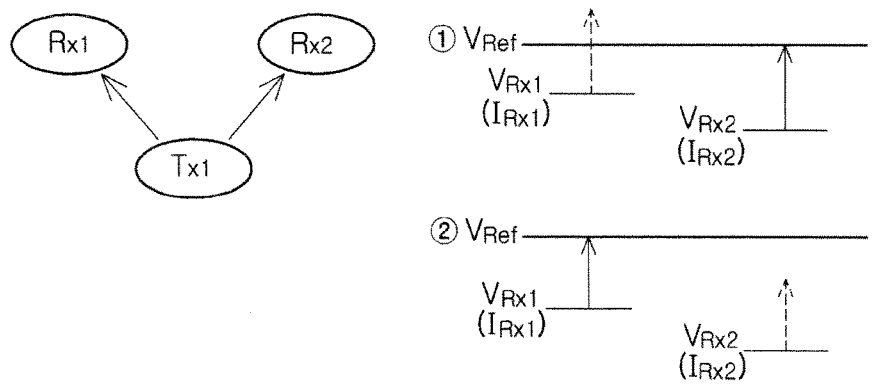

Referring to FIG. 8A, for example, the non-contact power supply apparatus according to an exemplary embodiment of the present disclosure may include one power transmitting unit Tx1 that may wirelessly transmit a power to at least two power receiving units Rx1 and Rx2.

Here, the power transmitting unit Tx1 may include a configuration illustrated in FIG. 4A or 4B, and each of the power receiving units Rx1 and Rx2 may include a configuration illustrated in FIGS. 5A through 5D.

For example, when a voltage VRx2 (or a current IRx2) detected by a second power receiving unit Rx2 is smaller than a voltage VRx1 (or a current IRx1) detected by a first power receiving unit Rx1, in the case of reference numeral ①, a level of the power transmitted by the power transmitting unit Tx1 in a non-contact manner may be increased so that the voltage VRx2 detected by the second power receiving unit Rx2 reaches a reference voltage VRef. Therefore, even in the case that the voltage VRx1 detected by the first power receiving unit Rx1 receiving the power transmitted by the power transmitting unit Tx1 in a non-contact manner exceeds the reference voltage VRef, there may be an advantage such as rapid power charging. Here, for example, the reference voltage VRef may be set so that a maximum allowable current flows in a corresponding battery cell.

In the case of reference numeral ②, a level of the power transmitted by the power transmitting unit Tx1 in a non-contact manner may be increased so that the voltage VRx1 detected by the first power receiving unit Rx1 reaches the reference voltage VRef. Therefore, even in the case that the voltage VRx2 detected by the second power receiving unit Rx2 receiving the power transmitted by the power transmitting unit Tx1 in a non-contact manner does not reach the reference voltage VRef, an advantage such as an increase in power transmission efficiency may exist.

Figure 8B:
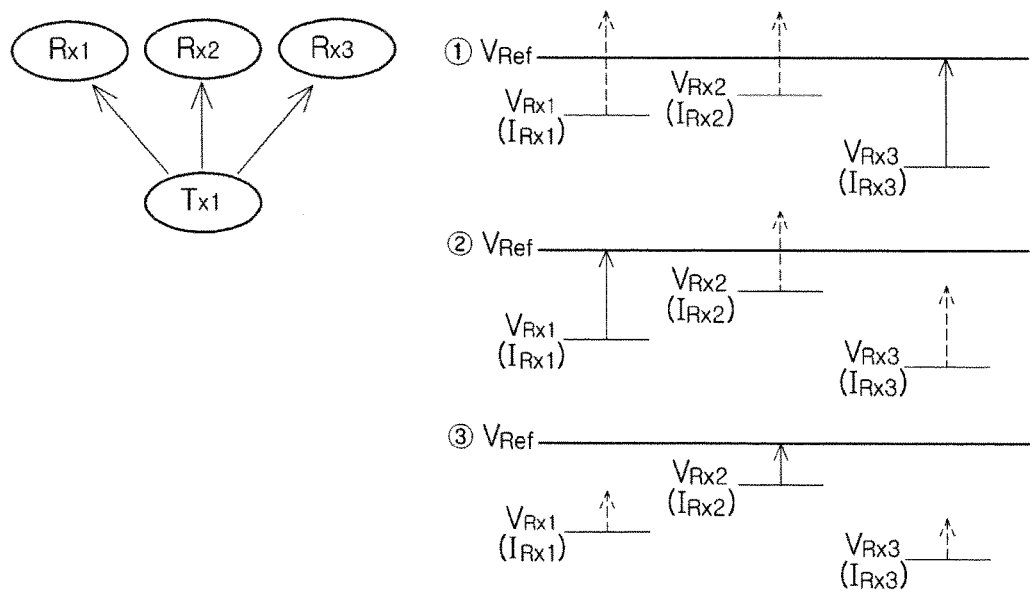

Referring to FIG. 8B, for example, the non-contact power supply apparatus according to an exemplary embodiment of the present disclosure may include one power transmitting unit Tx1 that may transmit a power to at least three power receiving units Rx1, Rx2, and Rx3 in a non-contact manner.

For example, when a voltage VRx2 (or a current IRx2) detected by a second power receiving unit Rx2 is higher than a voltage VRx1 (or a current IRx1) detected by a first power receiving unit Rx1 and a voltage VRx3 (or a current IRx3) detected by a third power receiving unit Rx3 is lower than the voltage VRx1 (or the current IRx1) detected by the first power receiving unit Rx1, in the case of reference numeral ①, a level of the power transmitted by the power transmitting unit Tx1 in a non-contact manner may be increased so that the voltage VRx3 detected by the third power receiving unit Rx3, which is a minimum value, reaches the reference voltage VRef. Therefore, even in the case that the voltage VRx1 detected by the first power receiving unit Rx1 receiving the power transmitted by the power transmitting unit Tx1 in a non-contact manner and the voltage VRx2 detected by the second power receiving unit Rx2 receiving the power transmitted by the power transmitting unit Tx1 in a non-contact manner exceed the reference voltage VRef, there may be an advantage such as rapid charging, and on the other hand, power transmission efficiency may be decreased.

In the case of reference numeral ②, a level of the power transmitted by the power transmitting unit Tx1 in a non-contact manner may be increased so that the voltage VRx1 detected by the first power receiving unit Rx1, an intermediate value, reaches the reference voltage VRef. Therefore, the voltage VRx2 detected by the second power receiving unit Rx2 receiving the power transmitted by the power transmitting unit Tx1 in a non-contact manner may exceed the reference voltage VRef, and the voltage VRx3 detected by the third power receiving unit Rx3 receiving the power wirelessly transmitted by the power transmitting unit Tx1 may not reach the reference voltage VRef.

In the case of reference numeral ③, a level of the power transmitted by the power transmitting unit Tx1 in a non-contact manner may be increased so that the voltage VRx2 detected by the second power receiving unit Rx2, which is a maximum value, reaches the reference voltage VRef. Therefore, even in the case that the voltage VRx1 detected by the first power receiving unit Rx1 receiving the power transmitted by the power transmitting unit Tx1 in a non-contact manner and the voltage VRx3 detected by the third power receiving unit Rx3 receiving the power wirelessly transmitted by the power transmitting unit Tx1 do not reach the reference voltage VRef, power transmission efficiency may be increased. On the other hand, a charging speed may be decreased.

Figure 8C:
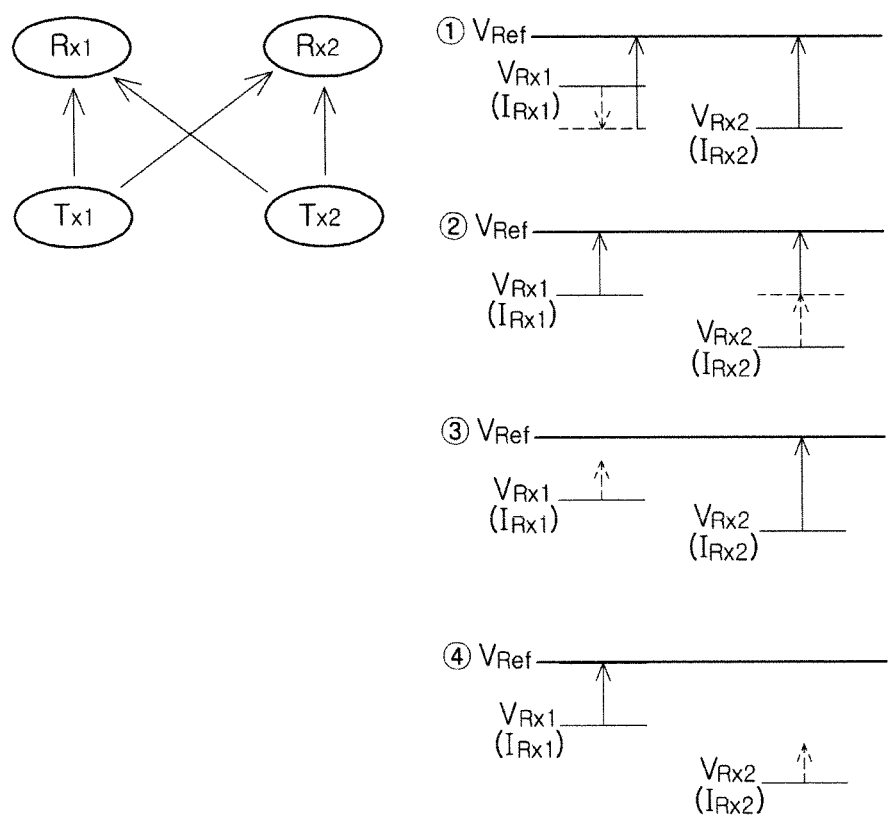

Referring to FIG. 8C, for example, the non-contact power supply apparatus according to an exemplary embodiment of the present disclosure may include at least two power transmitting units Tx1 and Tx2 that may wirelessly transmit power to at least two power receiving units Rx1 and Rx2.

For example, when a voltage VRx2 (or a current IRx2) detected by a second power receiving unit Rx2 is smaller than a voltage VRx1 (or a current IRx1) detected by a first power receiving unit Rx1, in the case of reference numeral ①, levels of power transmitted by first and second power transmitting units Tx1 and Tx2 in a non-contact manner may be controlled so that the voltage VRx1 detected by the first power receiving unit Rx1 is the same as the voltage VRx2 detected by the second power receiving unit Rx2. Then, the levels of power transmitted by the first and second power transmitting units Tx1 and Tx2 in a non-contact manner may be controlled so that the voltage VRx1 detected by the first power receiving unit Rx1 and the voltage VRx2 detected by the second power receiving unit Rx2 satisfy the reference voltage VRef.

In the case of reference numeral ②, the levels of power transmitted by the first and second power transmitting units Tx1 and Tx2 in a non-contact manner may be controlled so that the voltage VRx2 detected by the second power receiving unit Rx2 is the same as the voltage VRx1 detected by the first power receiving unit Rx1. Then, the levels of power transmitted by the first and second power transmitting units Tx1 and Tx2 in a non-contact manner may be controlled so that the voltage VRx1 detected by the first power receiving unit Rx1 and the voltage VRx2 detected by the second power receiving unit Rx2 satisfy the reference voltage VRef.

On the other hand, in the case of reference numeral ③ or reference numeral ④, the levels of power transmitted by the first and second power transmitting units Tx1 and Tx2 in a non-contact manner may be increased so that the voltage VRx2 detected by the second power receiving unit Rx2 reaches the reference voltage VRef or the levels of power transmitted by the first and second power transmitting units Tx1 and Tx2 in a non-contact manner may be increased so that the voltage VRx1 detected by the first power receiving unit Rx1 reaches the reference voltage VRef. Such an increase in an amount of power may be controlled depending on a coupling degree between the power receiving unit and the power transmitting unit to maintain a balance in power between the battery cells or charge respective battery cells with a maximum allowable charging current so as to rapidly charge the battery with power.

Figure 8D:
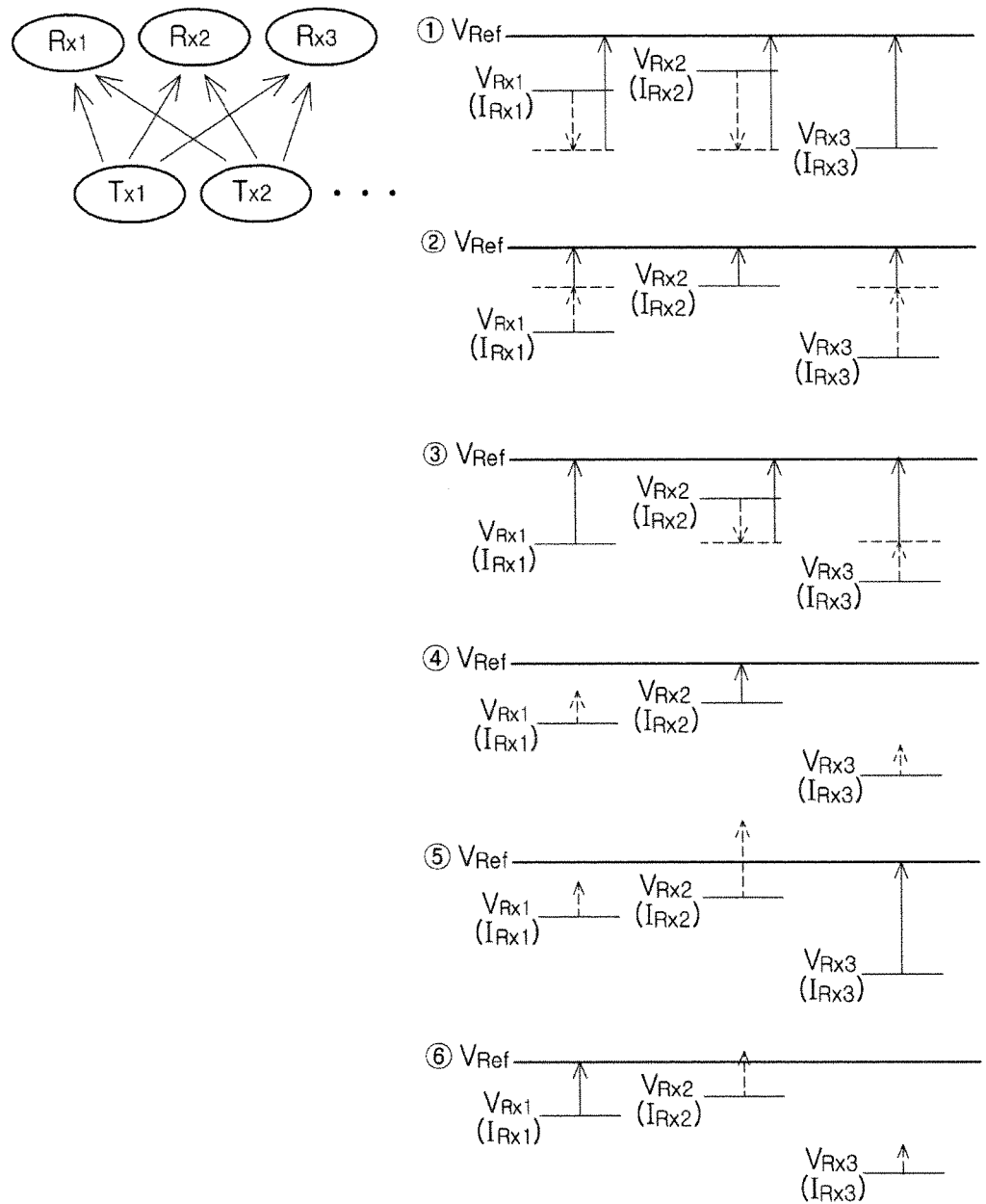

Referring to FIG. 8D, for example, the charging apparatus according to an exemplary embodiment of the present disclosure may include at least two power transmitting units Tx1 and Tx2 that may wirelessly transmit power to at least third power receiving units Rx1, Rx2, and Rx3.

When a voltage VRx2 (or a current IRx2) detected by a second power receiving unit Rx2 is higher than a voltage VRx1 (or a current IRx1) detected by a first power receiving unit Rx1 and a voltage VRx3 (or a current IRx3) detected by a third power receiving unit Rx3 is lower than the voltage VRx1 (or the current IRx1) detected by the first power receiving unit Rx1, in the case of reference numeral ①, levels of power transmitted by first and second power transmitting units Tx1 and Tx2 in a non-contact manner may be controlled so that the voltage VRx1 detected by the first power receiving unit Rx1 and the voltage VRx2 detected by the second power receiving unit Rx2 are the same as the voltage VRx3 detected by the third power receiving unit Rx3, which is a minimum value. Then, the levels of power transmitted by the first and second power transmitting units Tx1 and Tx2 in a non-contact manner may be controlled so that the voltage VRx1 detected by the first power receiving unit Rx1, the voltage VRx2 detected by the second power receiving unit Rx2, and the voltage VRx3 detected by the third power receiving unit Rx3 satisfy a reference voltage VRef.

In the case of reference numeral ②, the levels of power transmitted by the first and second power transmitting units Tx1 and Tx2 in a non-contact manner may be controlled so that the voltage VRx1 detected by the first power receiving unit Rx1 and the voltage VRx3 detected by the third power receiving unit Rx3 are the same as the voltage VRx2 detected by the second power receiving unit Rx2, which is a maximum value. Then, the levels of power wirelessly transmitted by the first and second power transmitting units Tx1 and Tx2 may be controlled so that the voltage VRx1 detected by the first power receiving unit Rx1, the voltage VRx2 detected by the second power receiving unit Rx2, and the voltage VRx3 detected by the third power receiving unit Rx3 satisfy the reference voltage VRef.

In the case of reference numeral ③, the levels of power transmitted by the first and second power transmitting units Tx1 and Tx2 in a non-contact manner may be controlled so that the voltage VRx2 detected by the second power receiving unit Rx2 and the voltage VRx3 detected by the third power receiving unit Rx3 are the same as the voltage VRx1 detected by the first power receiving unit Rx1, which is an intermediate value. Then, the levels of power transmitted by the first and second power transmitting units Tx1 and Tx2 in a non-contact manner may be controlled so that the voltage VRx1 detected by the first power receiving unit Rx1, the voltage VRx2 detected by the second power receiving unit Rx2, and the voltage VRx3 detected by the third power receiving unit Rx3 satisfy the reference voltage VRef.

In addition, in the case of reference numerals ④, ⑤ or ⑥, the levels of power transmitted by the first and second power transmitting units Tx1 and Tx2 in a non-contact manner may be increased so that the voltage VRx2 detected by the second power receiving unit Rx2 reaches the reference voltage VRef, the levels of power transmitted by the first and second power transmitting units Tx1 and Tx2 in a non-contact manner may be increased so that the voltage VRx3 detected by the third power receiving unit Rx3 reaches the reference voltage VRef, or the levels of power transmitted by the first and second power transmitting units Tx1 and Tx2 in a non-contact manner may be increased so that the voltage VRx1 detected by the first power receiving unit Rx1 reaches the reference voltage VRef. The first and second power transmitting units Tx1 and Tx2 may increase the levels of power transmitted by the first and second power transmitting units Tx1 and Tx2 in a non-contact manner so that the voltages detected by the power receiving units coupled to the first and second power transmitting units Tx1 and Tx2 in a non-contact manner reach the reference voltage. However, in this case, the power may also be transmitted to power transmitting units disposed in the vicinity of the first and second power transmitting units Tx1 and Tx2 in a non-contact manner.

Meanwhile, referring to FIGS. 9A and 9B, in the case in which the non-contact power supply apparatus according to an exemplary embodiment of the present disclosure includes at least two power transmitting units Tx1 and Tx2 as illustrated in FIGS. 8C and 8D, power coupling between the at least two power transmitting units Tx1 and Tx2 and at least two or three or more power receiving units Rx1, Rx2, and Rx3 may be set. In more detail, in the case in which power transmitting units transmit power in a non-contact manner, power receiving units receiving the greatest amount of power from the corresponding power transmitting units may be set to have the highest power coupling relationship.

To this end, a power coupling relationship between corresponding power transmitting units and power receiving units may be set depending on power state information having information on the voltages or the currents detected by the power receiving units Rx1, Rx2, and Rx3, and two power transmitting units Tx1 and Tx2 may be sequentially turned on and off, to search power receiving units most receiving the power from the corresponding power transmitting units, as illustrated in FIG. 9A, or power transmission amounts of two power transmitting units Tx1 and Tx2 may be alternately varied to search power receiving units having the largest change amount of power received from the corresponding power transmitting units, as illustrated in FIG. 9B.

According to exemplary embodiments of the present disclosure, amounts of power transferred at the time of charging respective battery cells with power may be adjusted for a respective battery cell to maintain a balance in power levels between the battery cells or a respective battery cell may be charged with maximum allowable charging currents thereof to thereby be rapidly charged.

As set forth above, according to exemplary embodiments of the present disclosure, amounts of power transferred at the time of charging respective battery cells with power may be adjusted for a respective battery cell to maintain the balance in power between the battery cells or the power may be transmitted in a non-contact manner at the maximum allowable charging currents of the battery cells to rapidly charge the battery cells with power.

While exemplary embodiments have been shown and described above, it will be apparent to those skilled in the art that modifications and variations could be made without departing from the scope of the present invention as defined by the appended claims.

What is claimed is:

1. A non-contact power supply apparatus comprising:
   power transmitting coils transmitting power to battery cells provided in a single target charging device in a non-contact manner; and
   a power conversion unit converting input power into output powers, adjusting a level of each of the output powers in response to power state signals transmitted by the single target charging device until all of voltage levels of powers received by the battery cells are within reference voltage range, and applying each of output powers to each of the power transmitting coils, respectively.

2. The non-contact power supply apparatus of claim 1, wherein the power conversion unit adjusts the level of each of the output powers such that all of voltage levels of powers received by the plurality of battery cells are same as one of a minimum voltage level, a maximum voltage level, and an intermediate voltage level all of voltage levels of powers received by the plurality of battery cells, and after, all of voltage levels of powers received by the plurality of battery cells are within the reference voltage range.

3. The non-contact power supply apparatus of claim 1, wherein the power conversion unit adjusts the level of the output power in response to the power state signals transmitted by charging units respectively charging the battery cells.

4. The non-contact power supply apparatus of claim 3, wherein the power conversion unit adjusts the level of the output power, based on a power state signal, provided by a charging unit having a minimum power level, from among the power state signals transmitted by the charging units.

5. The non-contact power supply apparatus of claim 1, wherein the power conversion unit adjusts at least one of a power switching duty and a power switching down time.

\* \* \* \* \*